Figure 1:
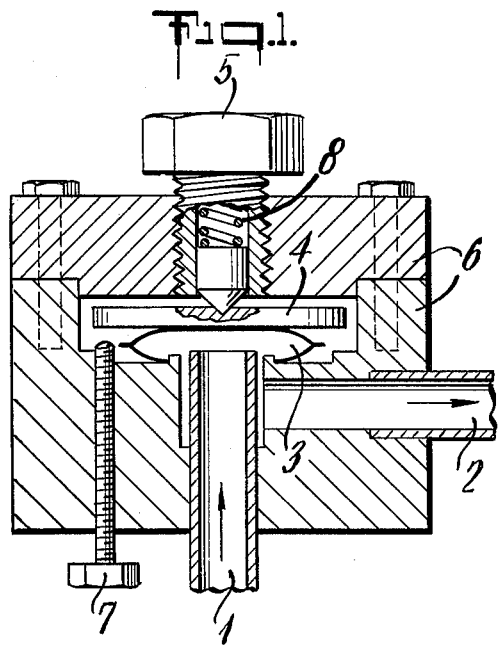

United States Patent [19]

Aus der Au et al.

[11] 4,083,379
[45] Apr. 11, 1978

[54] PRESSURE MEDIUM REGULATING DEVICE

[75] Inventors: Rudolf Aus der Au, Kehrsatz; Rudolf Schürch, Chur, both of Switzerland

[73] Assignee: Inventa AG fur Forschung und Patentverwertung, Zurich, Switzerland

[21] Appl. No.: 636,788

[22] Filed: Jan. 15, 1976

[30] Foreign Application Priority Data

Feb. 26, 1975 Switzerland ............ 2425/75

[51] Int. Cl.² .......................... G05D 16/08
[52] U.S. Cl. .......................... 137/495; 91/59; 137/494; 137/859
[58] Field of Search ............ 60/459, 494; 91/59; 137/469, 493.9, 494, 495, 852, 859; 173/12; 415/147

[56] References Cited

U.S. PATENT DOCUMENTS

| | | | |
|---|---|---|---|
| 1,653,811 | 12/1927 | McKeown | 137/494 |
| 2,557,536 | 6/1951 | Drane | 137/494 X |
| 3,371,759 | 3/1968 | Sapolsky | 137/494 X |
| 3,779,274 | 12/1973 | Kelly | 137/494 X |

*Primary Examiner*—Robert G. Nilson
*Attorney, Agent, or Firm*—Bierman & Bierman

[57] ABSTRACT

Pressure medium regulating device in which a fluid cell is positioned between the inlet and outlet of the device. The inlet is connected to a source of pressure medium and the outlet to a motor or other apparatus fed and operated by the regulating device. Flow through the regulator is reduced or increased in accordance with demand by the fluid cell which responds to line pressure of the pressure medium.

10 Claims, 4 Drawing Figures

U.S. Patent     April 11, 1978     4,083,379

PRESSURE MEDIUM REGULATING DEVICE

The present invention relates to a regulating device for controlling rates or quantities of flow of pressure media of the type which can be employed for regulating the torque and speed of fluid motors.

Fluid motors, in particular compressed-air motors, are known and have been in use as drives for many years. They are especially useful as drives for tools. However, conventional fluid motors have the disadvantage of having very high idling speeds in the unloaded state. Their air consumption is greatest when idling. High idling speeds are not only uneconomic as regards air consumption and wear, but are also dangerous in some applications (for example, in the case of grinding machines) and are all too frequently coupled with increased noise. At idle, various means for speed regulation and limitation have been adopted, such as throttle valves actuated by centrifugal force. Conventional throttling devices, such as centrifugally operated valves, merely allow limitation of the maximum speed to the highest speed required in operation of the motor under design load conditions (see, for example, the compressed-air motors of the Atlas Cop. Co., Stockholm, Sweden). Needless to say, these regulators have been expensive and far from ideal.

An ideal speed regulator would have to satisfy the following requirements:

1. Idling speed should be adjustable to any desired speed between 0 rpm. and maximum design speed.
2. Operating speed should be adjustable to any desired speed between about 25% and about 75% of the maximum speed. i.e. between about 50% and about 150% of the maximum efficiency speed.
3. Rapid and automatic upward adjustment to the needed operating speed on loading the motor or device to which the regulator is connected.
4. Rapid adjustment back to the idling speed on removal of load.
5. No rubbing or sliding components, so that even, essentially low frictin operation with dry. unoiled pressure media (for example, compressed air without the addition of oil mist) is ensured.
6. Lower requirements as regards manufacturing tolerances, so that cheap, mass production techniques may be used.

The regulator according to the invention meets all of these requirements. In addition and in accordance with a preferred embodiment of the invention, means are provided for adjusting the idling speed of the motor to any desired value below the maximum speed of the motor which permits the air consumption of the motor at idle to be substantially reduced.

The design of the regulating device according to the invention is extremely simple and it can readily be made of corrosion-resistant material, preferably of plastic. The basic design can be used in various applications, with slight modifications of the type anyone of ordinary skill in the art will be able to make without the need for further instruction herein.

In essence, the regulating device according to the present invention acts to adjust the flow of pressure medium, and also the pressure input, to the motor or other prime mover in accordance with the demand for pressure and medium necessary to operate the prime mover or motor for a given load, or no load, condition. This is achieved, in accordance with the invention, by a fluid cell placed upstream of the load and adapted to regulate the cross section of the inflow duct to the motor in response to the pressure of the pressure medium at the motor. For best results, the fluid cell is biased with a relatively small force, such as obtainable with a spring, additional pressure medium or any other type of biasing device, to close or restrict the inlet to the motor.

The fluid cell is positioned to sense and respond to increasing or decreasing pressure demand by the motor and increase or decrease the cross section of the connection between inlet and outlet ducts.

Most preferably, the fluid cell is used in place of a diaphragm. A diaphragm is essentially a two dimensional device most easily and commonly used to close two spaces off one from the other. The fluid cell, which is inflatable and of gas tight construction is a three dimensional element which is used herein to surround a closed space provided with inlet and outlet openings which enable the volume of the fluid cell to be varied to control flow between the inlet and outlet of the regulator by restricting or opening the passage between inlet and outlet.

Ideally but not necessarily, a thrust plate is provided to distribute pressure evenly across the fluid cell. Additionally, a thrust plate actuating device, such as an adjustable spring, is used to apply a bias to the fluid cell normally tending to deflate the cell and restrict the cross section of the passage between inlet and outlet. As can be appreciated, the fluid cell, biased by the thrust plate, normally tends to choke off flow of pressure medium to the motor in the event the pressure and flow needs of the motor are small (no load condition), and opens the cross section in response to increased pressure and flow requirements of the motor, all automatically. If desired, means may be provided to limit the minimum cross section to prevent complete flow disruption to the motor at no load and to permit the motor to idle at low speed.

By fluid cell there is understood a cell which is freely collapsible and inflatable, such as, for example, a bag or bladder which is not secured to the regulator in the region of its rim or margin. In the pressureless state, the fluid cell is a creaseless, practically planar structure having an internal volume of about zero. Within its intended limits, it can be filled by means of a pressure medium due to its inflatability. The envelope of this bladder or cell is not stretchable to a considerable degree, either in an elastic or in a non-elastic manner, by the internal pressure in the pressure ranges to which it is to be subjected.

The fluid cell comprises two superposed flexible and fluid-tight sheet structures, for example, films, coated fabrics, etc., which are directly united over their entire periphery, for example, by heat sealing, cementing or sewing, and which are provided with an inlet and an outlet opening for the admission of pressure medium. The inlet and outlet are advantageously not located in the marginal zone or area of the fluid cell but rather in the region in which it is secured to the regulator.

The material forming the fluid cell does not need to be elastic, but must be readily flexible enough to allow the cell to inflate in response to incoming pressure fluid. This material or the film in question may consist of any desired plastic or of a plastic-coated fabric. Thus, for example, it may consist of polyamide or polyvinyl chloride. It may, however, also be constructed of rubber or rubberized fabric.

The inlet and outlet passages in the regulator may be separated from one another by a throttling point at which the fluid cell is located. Basically, there may be used as pressure media compressible pressure media such as compressed air and compressed gases and incompressible pressure media of not too high viscosity, such as, for example, water and hydraulic oil, but in particular compressed air and, advantageously, oil-free compressed air.

The regulating device is used with advantage as close as possible to the load. Thus, it may be installed, for instance, in the control head of the motor.

Accordingly, the present invention consists of a regulating device for controlling rates or quantities of flow of pressure media which is characterized in that the pressure adjusting itself between the regulating device throttling the pressure medium and the load connected at the outlet side and driven by the pressure medium is employed for direct control of the regulating device, and is characterized in that it has an inflatable fluid cell connecting the inlet and outlet passages or a diaphragm adjacent these passages and a device producing a force tending to shut the flow down, such as, for example, a thrust plate, together with corresponding actuating means, respectively.

Referring now to the drawings in which like numerals refer to like parts and which depict various preferred embodiments:

FIGS. 1 through 4 each are plan views in detail of separate embodiments of the present invention.

The fluid-cell regulator shown in FIG. 1 comprises the following component parts:
Inlet passage 1
Outlet passage 2
Fluid cell 3; and
Thrust plate 4 with hollow adjusting screw 5, housing 6, idling adjustment screw 7, and compression spring 8.

The spring-loaded fluid cell 3 is in the collapsed state it closes the inlet connection 1 tightly when there is no load on the motor. This may be undesirable when a small supply of air is desired, as when the motor is at idle and a complete shut down is not desired. To keep a small supply of pressure medium flowing to the motor, and idling screw 7 is mounted in the housing and acts on the thrust plate to prevent the said thrust plate from completely collapsing the fluid cell. In this position of the thrust plate, the regulator acts as a throttle valve and the throughput of pressure medium with a given pressure in front of the valve is constant. With this amount regulated in this way, a defined low pressure adjusts itself between the regulator and the motor, so that the motor rotates at an idling speed adjustable by changing the minimum flow cross section by use of the idling screw and consumes precisely the adjusted amount of pressure medium. The idling speed can also be regulated by means of an adjustable jet in a short-circuiting bore between the inlet passage and the outlet passage (not shown), or be predetermined by means of a non-adjustable jet at this point.

If a torque is required of the idling motor, such as when a load is applied thereto, the speed of the motor is at first reduced. A higher pressure immediately builds up in the small space between the regulator and the motor. This pressure inflates the fluid cell correspondingly, overcomes the resistance of the spring urging the thrust plate to close the fluid cell, and, with suitable design, spontaneously frees the full valve cross section, so that the full pressure and the full amount of pressure medium are immediately available to the motor. By means of the spring characteristic and the spring tension chosen for spring 8, the maximum possible operating speed can be adjusted as a function of the amount of air.

Conversely, removing the load from the motor leads to an increase in motor speed and to a spontaneous pressure drop between the regulator and the motor. This produces a reduction in pressure in the fluid cell of the regulator. The regulator spring again becomes fully operable and is able to reduce the flow by closing the fluid cell (decreasing it's available flow cross section), until it abuts the idling screw. Hence, operation at the adjusted idling speed is again achieved.

By coordinating the cell size and the spring characteristic, any operating condition between idling and maximum speed can be designed for and kept stable as well.

The valve/regulator of the invention may serve primarily for regulating the torque and speed of fluid motors, in particular compressed-air motors, which can thereby be given novel, highly desirable and efficient operating characteristics.

Figure 2:
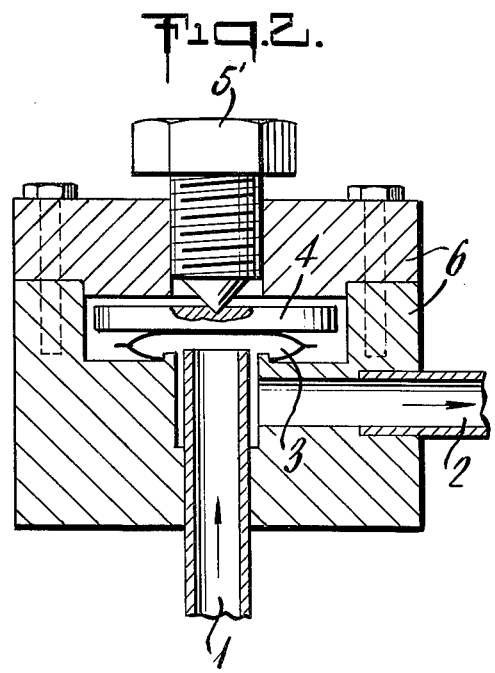

The manual fluid-cell valve shown in FIG. 2 regulates the rate of flow by direct actuation of the adjusting screw 5', the distance of the fluid cell from the inlet opening and, thus, the flow cross-section being varied via the thrust plate 4 as explained above in connection with FIG. 1.

With the aid of this arrangement, it is possible to have a handy shut-off and regulating valve which can be actuated manually in continuously variable fashion.

Figure 3:
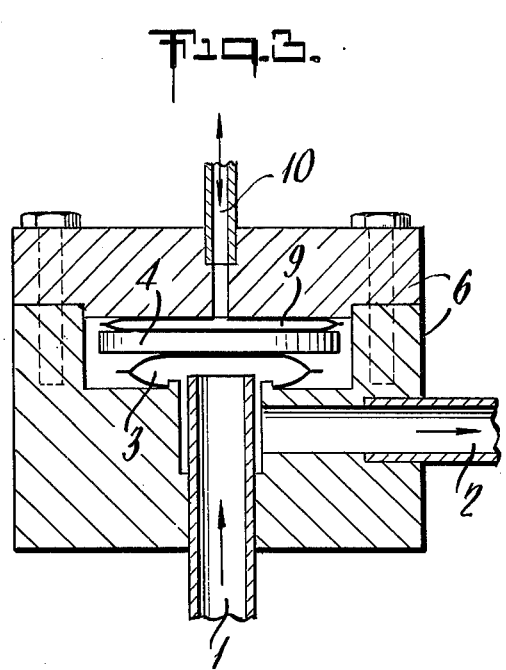

FIG. 3 shows a fluid-cell valve with pneumatic or hydraulic remote control.

In this case, actuation of the thrust plate is controlled by an auxiliary fluid cell 9 connected to a third inlet 10. Depending on the size which is used for this second fluid cell, the fluid cell 3 can be adjusted by any desired remote control system per se by means of a pressure greater or smaller than that prevailing at the inlet, prime fluid cell 3, or outlet 2, such as another but conventional control valve adapted to control a pressure input into the outlet 2 of the regulator (not shown). Also by taping pressure medium upstream and/or downstream, special characteristics of interest are obtainable.

This arrangement provides a remote-controlled valve which can control the flow rates of pressure media with any desired control pressures.

Figure 4:
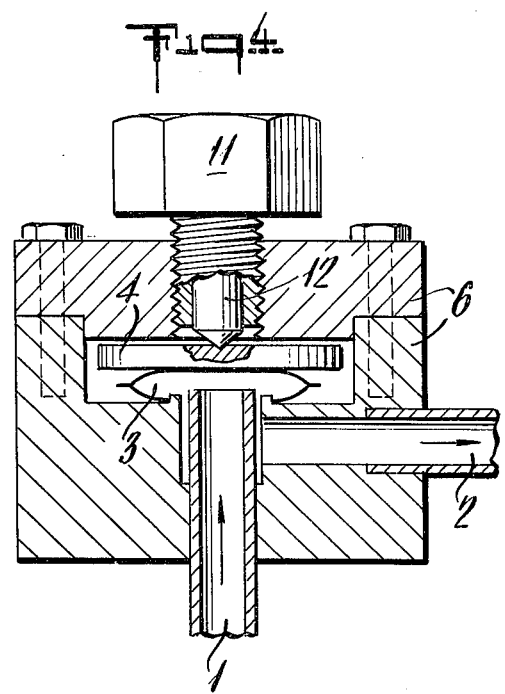

The magnetic fluid-cell valve shown in FIG. 4 regulates the rate of flow by actuation of the plug 12 controlled by means of an electromagnet indicated at 11, similarly to the spring-controlled action shown in FIG. 1; the distance of the fluid cell 3 from the inlet opening of the feed passage 1 is varied via the thrust plate 4 as above.

This arrangement provides a shut-off valve similarly to FIG. 2 which can be actuated by an electromagnet.

The above described embodiments are not exhaustive and are not intended to be limiting. It is intended to cover all modifications in and to the invention which fall within the spirit and scope of the claims appended hereto.

What is claimed is:

1. Regulating device for controlling the flow of a pressure medium to a load, comprising an inlet passage, an outlet passage, an inflatable flexible cell interconnecting said inlet and outlet passages, the said cell providing the sole enlarged or restricted connection between said passages, said outlet passage adapted to be connected to said load whereby said inflatable cell restricts the flow of said pressure medium in response to a decrease in pressure occurring between said outlet passage and said load and increases said flow in response to an increase in said pressure, and means for controlling the volume of said inflatable cell and thus the cross-section of the interconnection between said inlet and outlet passages.

2. Regulating device in accordance with claim 1, in which said inflatable flexible cell is a self-contained substantially flat unit having substantially circular opposed faces rigidly connected together at their circumference, whereby said cell expands or retracts solely in an axial direction.

3. Regulating device according to claim 2, in which said inlet and outlet passages both penetrate one face of said cell.

4. Regulating device according to claim 3, in which said control means comprises a thrust plate contacting the other face of said cell, and means for changing the position of said thrust plate.

5. Regulating device according to claim 4, in combination with adjustable means limiting the movement of said thrust plate against the said other face of said flexible cell whereby a connection between the inlet and outlet passages may be maintained irrespective of the pressure on said thrust plate.

6. Regulating device according to claim 4, in which the means for changing the position of said thrust plate comprises a compression spring acting thereupon.

7. Regulating device according to claim 6, in combination with means adjusting the compression of said spring.

8. Regulating device according to claim 4, in which the means for changing the position of said thrust plate comprises an electromagnet.

9. Regulating device according to claim 3, in which said control means comprises a second inflatable flexible cell in pressure contact with the other face of said first flexible cell.

10. Regulating device according to claim 9, in combination with a thrust plate between said first and second inflatable cells.

* * * * *